June 15, 1926.

G. L. KNOX

MULTIPLE WHEEL TRAILER

Filed Sept 8, 1924     2 Sheets-Sheet 1

1,588,842

Inventor.
Garner L. Knox.
Attorney.

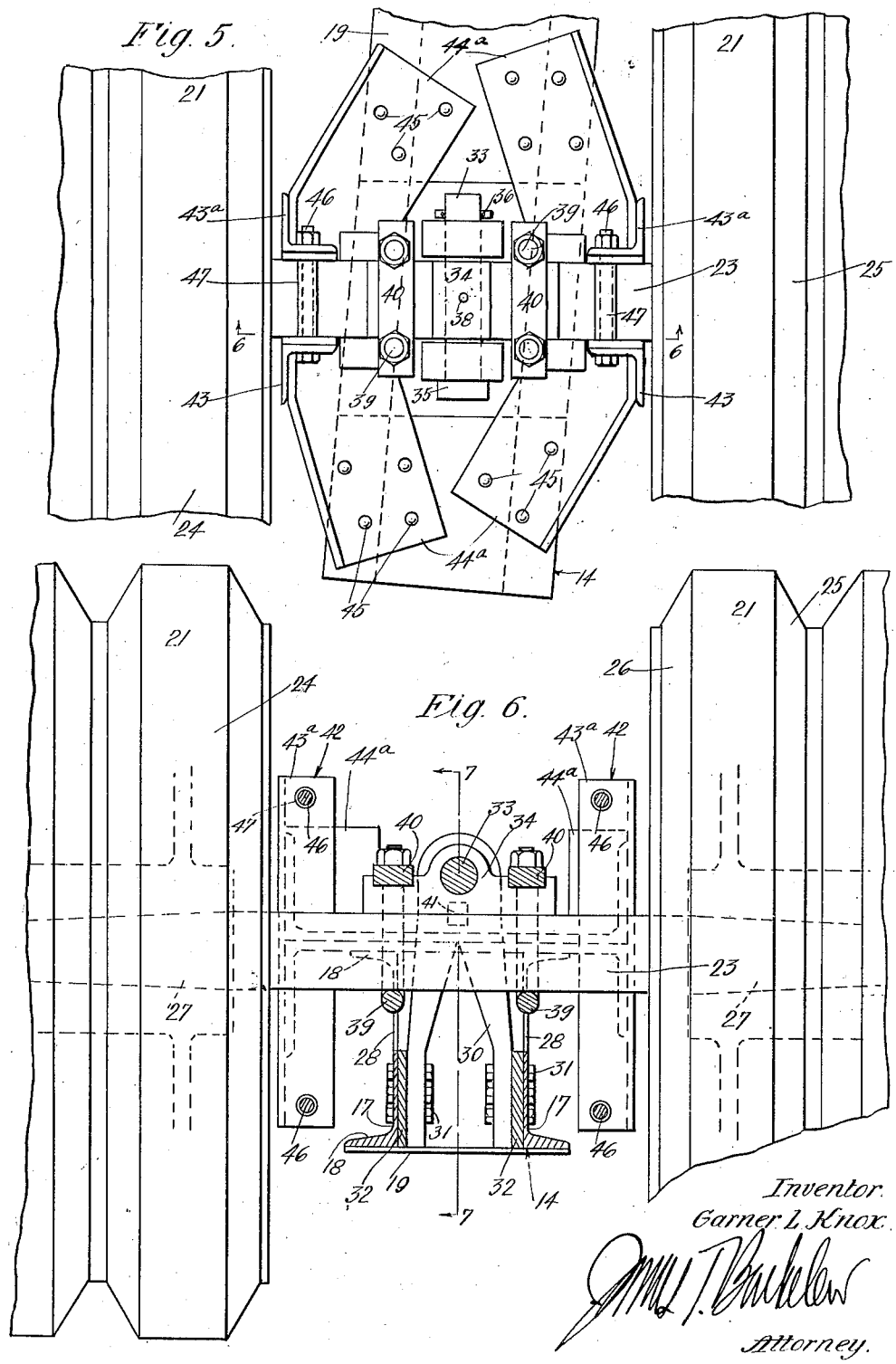

Patented June 15, 1926.

1,588,842

UNITED STATES PATENT OFFICE.

GARNER L. KNOX, OF LOS ANGELES, CALIFORNIA, ASSIGNOR TO UTILITY TRAILER MANUFACTURING COMPANY, A CORPORATION OF CALIFORNIA.

MULTIPLE-WHEEL TRAILER.

Application filed September 8, 1924. Serial No. 736,492.

This invention relates to improvements in vehicles, and is particularly concerned with "heavy-duty" trailers. I have illustrated and will describe the invention as embodied in this particular type of vehicle, but it is not to be inferred that this reference to a particular type is an intimation that the invention is so limited in embodiment, for it is advantageously applicable to other types of vehicles.

Heavy duty trailers are employed for the transportation of such machines as hoisting engines, excavating machines, concrete mixing plants, and the like. Such trailers must, of course, be of extremely heavy, sturdy construction in order that they stand up under the most severe service conditions, and the weight of such trailers, in loaded condition, is extremely great, and often has disastrous effects on roadways. In fact, there are many local ordinances in effect which make it unlawful to transport these excessively heavy loads in trucks of usual design.

The destructive effects on roadways, and also the failure of many trucks to stand up under these severe strains imposed is largely due to the imperfect distribution of load on the running gear and hence on the roadway. Therefore, generally speaking, it is the object of my invention to provide a truck which is not only exceedingly sturdy of construction, but also provides for the even distribution of load over the running gear and roadway to the end that the foregoing objectionable features are overcome.

I provide at least four wheels at the rear of the trailer (each wheel may be of "double" type) which wheels are preferably in axial alinement when the trailer is on a roadway having no crown or having no irregularities when considered in cross section.

Of course, it is desirable, no matter what the road conditions may be, that each wheel be as nearly as possible in full facial contact with the ground and that the load on each wheel be evenly distributed over the extent of said facial contact. Therefore, I group the wheels in pairs and provide for independent flexibility of the pairs with respect to the trailer frame.

While this independent flexibility may be accomplished by the use of cross-springs mounted on the trailer frame and connecting the wheels of a given pair so the wheels of each pair are movable independently as well as the pairs considered as independent units (and such a wheel mounting lies within the scope of my broader claims) the great weight of the trailer and load and the degree of structural rigidity necessitated thereby makes it preferable that the wheels of each pair be connected by an independent, rigid axle, and that each axle have independent pivotal connection with the trailer frame.

Preferably, this connection is in the form of a pin and socket joint, and is such that the wheel-pairs are independently movable, pivotally, through substantially vertical axial planes, so the wheel-pairs may independently adjust themselves to the crown or irregularities of the roadway.

By reason of their pivotal connections with the trailer frame, each axle remains substantially parallel to the comparatively short stretch of underlying roadway, so the weight imposed on each wheel-pair is evenly distributed over the area of surface contact between each wheel and the ground.

Were the wheel pairs not thus capable of independent movement, the outer peripheral edges of certain of the wheels would be excessively worn when passing over crowned roadways or roadways which are irregular in cross-section contour, for the load weight would be concentrated on these edges due to the variable distance between the ground surface and the normal axes of the several wheels. In certain situations, this effect would also result in wracking the trailer frame.

In the preferred embodiment of the invention, I utilize a V frame and have provided for the three-point suspension of said frame, there being the two described connections between the free ends of the frame legs and the individual rear axles, and a single point of connection between the forward wheels and the apex of the frame. In order that the forward and rear wheels may independently follow irregularities of the roadway without tending to wrack the trailer frame, I have provided a trunnion and socket connection between the frame and the forward axle, the trunnion preferably being disposed in axial parallelism with the pivot pins of the rear axle mountings.

Other novel features and objects of the invention will be set forth in the following detailed description, reference being had to the accompanying drawings in which:—

Fig. 5 is an enlarged, fragmentary plan view illustrating the connection between the trailer frame and one of the rear axles;

Fig. 6 is a vertical section on line 6—6 of Fig. 5; and

Figure 2:
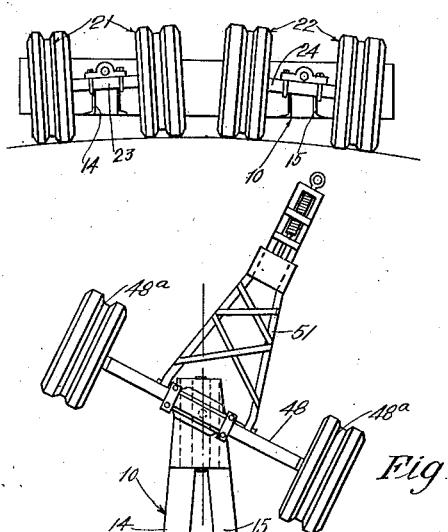
Fig. 2 is a rear elevation of the trailer, illustrating the wheel positions when on the crown of a road.
Figure 1:
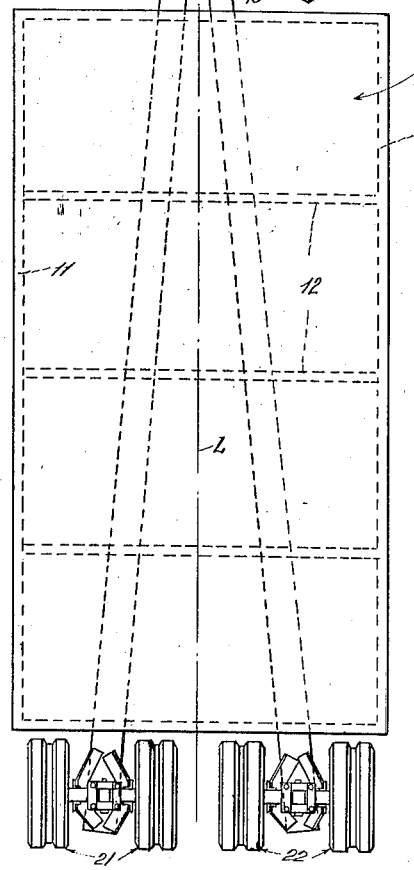
Fig. 1 is a top plan view of a trailer embodying my invention.
Figure 7:
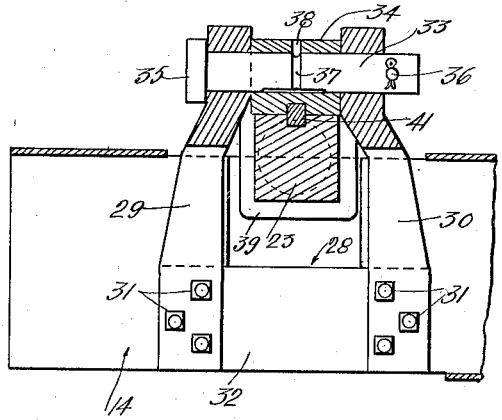
Fig. 7 is a vertical section on line 7—7 of Fig. 6.

While I will describe the trailer as including an under-slung V frame having a particular type of connection with the forward axle, it will be understood the invention, in its broader aspects, is not limited to these particularities of construction, for it lies within the scope of my claim to embody my novel rear-end construction in trailer frames of various types connected to forward axles in various manners. Or the rear-end construction may be embodied in so-called "semi-trailers". I have also illustrated the trailer as having two pairs of rear wheels, but it will be understood that by proper frame construction, additional sets or pairs may be added. Such additions lie, of course, within the scope of my claim.

The body of the trailer includes V frame 10, (the longitudinal axis of which is indicated by line L) side rails 11, cross member 12, and flooring 13. The rails and cross members may be secured to frame 10 in any of the well known manners.

Preferably, the legs 14 and 15 of the frame 10 are in the form of box beams, channels 17 (with flanges 18 facing out) being connected by cover plates 19.

Figure 3:
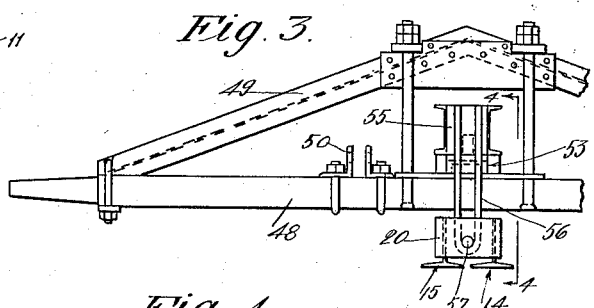
Fig. 3 is an enlarged fragmentary view of the forward axle and its connection with the truck frame.
Figure 4:
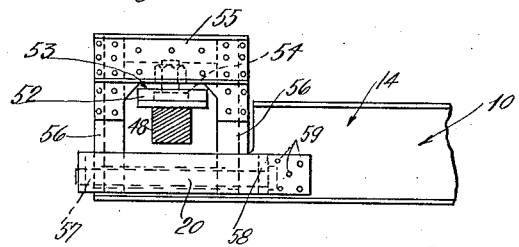
Fig. 4 is an enlarged vertical section on line 4—4 of Fig. 3.

The apex of the V-frame is formed by joining the forward extremities of beams 14 and 15 with U-strap 20 (see Figs. 3 and 4). The channels of each beam are so arranged that they are horizontally spaced at their rearward ends and brought together so their webs contact at their forward ends. This construction makes for convenient attachment of U-strap 20 and the mounting of the forward axle, as will be later described.

The rearward extremities of beams 14 and 15 support wheel-pairs or units 21 and 22, respectively, but since these sets and their connections with the frame are identical, I will describe only one in detail. It will be noted, however, that the two sets have independent axles 23 and 24.

Considering wheel-pair 21, wheels 25 and 26 (preferably provided with usual rubber tires of the double-tread type illustrated) are mounted for rotation on the opposite terminal spindles 27 in any suitable manner. Beam 14 is cut away at 28 to accommodate axle 23 and this beam supports the internally arranged and oppositely disposed hangers 29, 30, these hangers being bolted at 31 to the webs of channels 28 which are preferably reinforced by plates 32 at point of bolting.

Hangers 30 receive the opposite extremities of pivot pin 33, which, in turn, is supported by the axle-carried bracket 34. Pin 33 is held against longitudinal displacement by head 35 and the cotter-keyed pin 36. Oilway 37 in pin 33 and the registering aperture 38 in bracket 34 provide means for feeding lubricants to the hinge joint just described.

U-bolt clips 39 and clip-straps 40 serve to clamp bracket 34 securely to axle 23, dowel 41 aiding in holding the bracket against displacement; and pin 33 is retained in such position with respect to axle 23 and beam 14 that wheels 25, 26 are free to swing radially through a substantially vertical axial plane. In order that the wheel swing may be confined to an axial plan substantially perpendicular to the longitudinal axis of the trailer (in other words, so the wheel pair may not swing horizontally about its point of pivotal connection with the trailer frame and thereby over-strain said connection and tend to make the pair, as a unit, "toe-in" or "toe-out") I provide vertical guides 42 on opposite sides of pivot pin 33. Each guide consists of opposed upright angles 43, 43ª which are supported by braces 44ª, said braces being riveted to beam 14 at 45. Tie rods 46 and pipe-spacers 47, thereon, are arranged at top and bottom of uprights 46 and serve to maintain them in predetermined spaced relation to provide a vertical guideway through which axle 23 may swing vertically but not horizontally.

The forward axle 48, carrying forward wheels 48ª, is preferably trussed at 49, and carries up-standing ears 50 for the attachment of tongue 51. The forward end of frame 10 is supported by axle 48 in the following manner. Socket member 52 of fifth-wheel 53 is secured to axle 48, while the king-bolt or headed pin member 54 of the fifth-wheel is carried by the bridge-piece 55 which connects the upper extremities of U-hangers 56. These hangers support the horizontal pin 57 which is maintained substantially in axial parallelism with pivot pins 33 by reason of its end mounting in U-strap 20 (which, as has been explained, is secured to the apex of frame 10) and a cross bar 58 which extends between and is secured to beams 14, 15 at 59. The pivotal connection provided by pin 57 and its bearings in U-strap 20 and bar 58, allow for relative vertical pivotal movement between frame 10 and axle 48, while hangers 56 are spaced from the front and rear of axle 48 sufficiently to allow said axle to be swung horizontally for guiding purposes. The front wheel assembly may be detached from frame 10 by withdrawing pin 57 and dropping the forward end of said frame.

It will be seen from the foregoing description that each of the three sets of wheels are mounted on independent axles, that the axles are capable of independent pivotal movement about horizontal axes which are substantially parallel to the longitudinal axis of the trailer; and therefore that each set of wheels is capable of adjusting itself independently to road irregularities, all in a manner to bring about the desirable results enumerated above, as well as others which need not be entered into.

It will be understood that the drawings and specification are to be considered illustrative of and not restrictive on the appended claim, for certain changes in structure, design and arrangement may be made without departing from the spirit and scope of this claim. Therefore, I do not wish to be limited to the illustrated and described embodiment of the invention, except for such limitations as a fair interpretation of the appended claim may import.

Having described a preferred form of my invention, I claim:—

In a vehicle structure, a frame, a plurality of wheel-pairs near one end of the frame, an independent connection between each wheel-pair and said frame, each of said connections including an axle for the wheel-pair, a pivot pin secured to the frame and arranged substantially in axial parallelism therewith, and a member attached to the axle and having pivotal connection with said pin; and vertically extending stationary guides on the frame adapted to engage vertically opposite sides of said axle during pivotal movement thereof about the pin and to receive from said axle strains of torque set up by the tendency of the wheel-pair to rotate through substantially horizontal planes about the connection and thereby relieve said connection from said strains.

In witness that I claim the foregoing I have hereunto subscribed my name this 28th day of August 1924.

GARNER L. KNOX.